(12) United States Patent
Parambil et al.

(10) Patent No.: US 9,467,674 B2
(45) Date of Patent: Oct. 11, 2016

(54) MOBILE TERMINAL AND CONTROL METHOD THEREOF

(71) Applicant: LG ELECTRONICS INC., Seoul (KR)

(72) Inventors: Sharfudheen Parambil, Bangalore (IN); Deepthi John, Bangalore (IN)

(73) Assignee: LG ELECTRONICS INC., Seoul (KR)

(*) Notice: Subject to any disclaimer, the term of this patent is extended or adjusted under 35 U.S.C. 154(b) by 64 days.

(21) Appl. No.: 13/875,339

(22) Filed: May 2, 2013

(65) Prior Publication Data
US 2014/0193133 A1 Jul. 10, 2014

(30) Foreign Application Priority Data

Jan. 8, 2013 (KR) ........................ 10-2013-0002250

(51) Int. Cl.
| | | |
|---|---|---|
| *H04N 5/775* | (2006.01) | |
| *H04N 9/87* | (2006.01) | |
| *H04N 5/77* | (2006.01) | |
| *H04N 5/783* | (2006.01) | |
| *H04N 21/433* | (2011.01) | |
| *H04N 21/44* | (2011.01) | |
| H04N 5/76 | (2006.01) | |

(52) U.S. Cl.
CPC ............... *H04N 9/87* (2013.01); *H04N 5/772* (2013.01); *H04N 5/783* (2013.01); *H04N 21/4333* (2013.01); *H04N 21/44008* (2013.01); H04N 5/76 (2013.01)

(58) Field of Classification Search
CPC ..... H04N 21/4333; H04N 5/772; H04N 9/87
USPC .................................................. 386/230, 241
See application file for complete search history.

(56) References Cited

U.S. PATENT DOCUMENTS

| | | | |
|---|---|---|---|
| 5,572,260 A * | 11/1996 | Onishi et al. ................ 348/460 |
| 5,899,575 A * | 5/1999 | Okayama et al. ............ 386/200 |
| 2006/0120692 A1* | 6/2006 | Fukuta ............................ 386/95 |
| 2009/0269032 A1* | 10/2009 | Taira et al. ..................... 386/95 |
| 2013/0011114 A1* | 1/2013 | Tashiro et al. ................ 386/230 |
| 2013/0251343 A1* | 9/2013 | Lai et al. ....................... 386/264 |

* cited by examiner

*Primary Examiner* — Thai Tran
*Assistant Examiner* — Jose Mesa
(74) *Attorney, Agent, or Firm* — Ked & Associates, LLP

(57) ABSTRACT

The present disclosure relates to a mobile terminal and a control method thereof capable of outputting a content. A mobile terminal according to an embodiment of the present disclosure may include an output unit formed to output a content; an analysis unit configured to monitor a time point where the reproduction of the content is paused and analyze the reproduction paused content when the reproduction of the content is paused; and a controller configured to determine a time point where the reproduction of the content is started based on the analysis result of the content when a control command for reproducing the content again is sensed.

13 Claims, 16 Drawing Sheets

FIG. 9
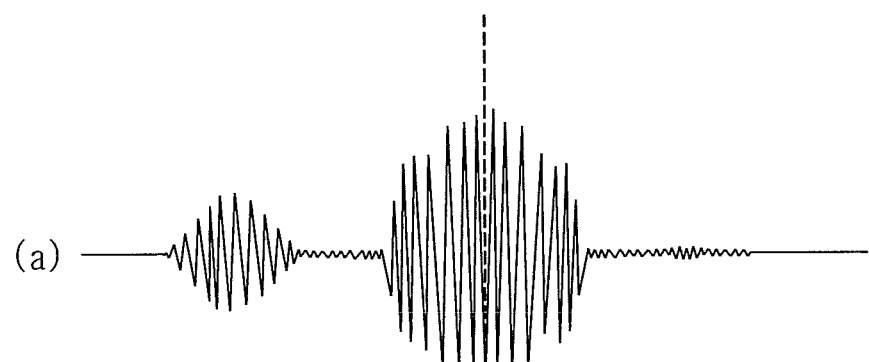
(a)
d1:PAUSE TIME POINT
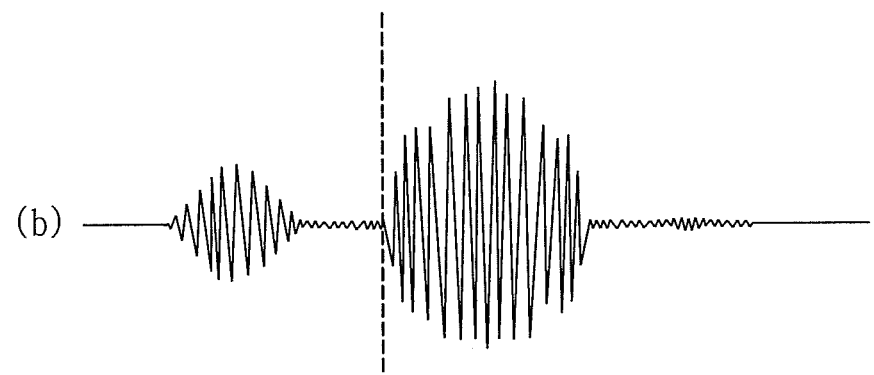
(b)
d2:PLAY START TIME POINT

MOBILE TERMINAL AND CONTROL METHOD THEREOF

RELATED APPLICATION

Pursuant to 35 U.S.C. §119(a), this application claims the benefit of earlier filing date and right of priority to Korean Application No. 10-2013-0002250, filed on Jan. 8, 2013, the contents of which is incorporated by reference herein in its entirety.

BACKGROUND OF THE INVENTION

1. Field of the Invention

The present disclosure relates to a mobile terminal, and more particularly, to a mobile terminal and a control method thereof capable of outputting a content.

2. Description of the Related Art

Terminals can be classified into two types, such as a mobile or mobile terminal and a stationary terminal based on its mobility. Furthermore, the mobile terminal can be further classified into two types, such as a handheld terminal and a vehicle mount terminal based on whether or not it can be directly carried by a user.

As it becomes multifunctional, for example, such a terminal is allowed to capture still images or moving images, play music or video files, play games, receive broadcast and the like, so as to be implemented as an integrated multimedia player. Moreover, the improvement of structural or software elements of the terminal may be taken into consideration to support and enhance the functions of the terminal.

Owing to the enhancement, the terminal may reproduce a content. When a control command for reproducing the content again is sensed after pausing the reproduction of the content, the terminal may reproduce the content from a time point where the reproduction of the content is paused. However, from the standpoint of the user, he or she may have inconvenience in which the continuation of the content is interrupted.

SUMMARY OF THE INVENTION

An objective of the present disclosure is to provide a mobile terminal and control method thereof capable of enhancing the user's convenience in reproducing a content again after pausing the reproduction of the content.

A mobile terminal according to an embodiment of the present disclosure may include an output unit formed to output a content; an analysis unit configured to monitor a time point where the reproduction of the content is paused and analyze the reproduction paused content when the reproduction of the content is paused; and a controller configured to determine a time point where the reproduction of the content is started based on the analysis result of the content when a control command for reproducing the content again is sensed.

As an embodiment, the content may include at least one of video data and audio data, and the output unit may include a display unit formed to output the video data; and an audio output unit formed to output the audio data.

As an embodiment, the analysis unit may analyze the attribute of the content corresponding to a period from a time point where the reproduction of the content is paused to a preset time point.

As an embodiment, the controller may detect time points where the attribute of the content is changed when a control command for reproducing the content again is sensed, and determine a time point the closest to the time point where the reproduction of the content is paused among the detected time points as a time point where the reproduction of the content is started.

As an embodiment, the analysis unit may analyze objects contained in the video data corresponding to a period up to the preset time point to detect a time point where the scene is changed.

As an embodiment, the controller may determine a time point the closest to the time point where the reproduction of the content is paused among the scene changed time points as a time point where the reproduction of the content is started when a control command for reproducing the content again is sensed.

As an embodiment, the analysis unit may analyze a change of at least one of an oscillation frequency, a wave shape and an amplitude of the audio data corresponding to the period up to the preset time point.

As an embodiment, when a control command for reproducing the content again is sensed, the controller may determine a time point the closest to the time point where the reproduction of the content is paused as a time point where the reproduction of the content is started among the time points where the background music is changed.

As an embodiment, when reproduction is paused while outputting a word through the audio output unit, the controller may determine a start time point of the word as a time point where the reproduction of the content is started.

As an embodiment, when a control command for reproducing the content again is sensed, the controller may determine a time point where the reproduction of the content is started based on number-of-times information in which the reproduction of the content is paused.

As an embodiment, when the number-of-times information in which the reproduction of the content is paused corresponds to preset number-of-times information, the controller may determine a time point where the reproduction of the content is paused as a time point where the reproduction of the content is started.

As an embodiment, when a control command for reproducing the content again is sensed, the controller may determine a time point where the reproduction of the content is started based on time information for which the reproduction of the content has been paused.

As an embodiment, when the time information for which the reproduction of the content has been paused corresponds to preset time information, the controller may determine a time point where the reproduction of the content is paused as a time point where the reproduction of the content is started.

As an embodiment, when a control command for reproducing the content again is sensed in case that the time point where the reproduction of the content is paused corresponds to a position located within a preset time point on the basis of the start time point of the content, the controller may determine the start time point of the content as a time point where the reproduction of the content is started.

A control method of a mobile terminal according to an embodiment of the present disclosure may include outputting a content being reproduced; monitoring a time point where the reproduction of the content is paused and analyzing the reproduction paused content when the reproduction of the content is paused; and determining a time point where the reproduction of the content is started based on the analysis result of the content when a control command for reproducing the content again is sensed.

As an embodiment, said analyzing the reproduction paused content may include analyzing the attribute of the content corresponding to a period from a time point where the reproduction of the content is paused to a preset time point.

As an embodiment, said determining a time point where the reproduction of the content is started may include detecting time points where the attribute of the content is changed when a control command for reproducing the content again is sensed; and determining a time point the closest to the time point where the reproduction of the content is paused among the detected time points as a time point where the reproduction of the content is started.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 7 through 9 are conceptual view illustrating a user interface associated with the reproduction of audio data according to an embodiment of the present disclosure;

DETAILED DESCRIPTION OF THE INVENTION

Figure 1:
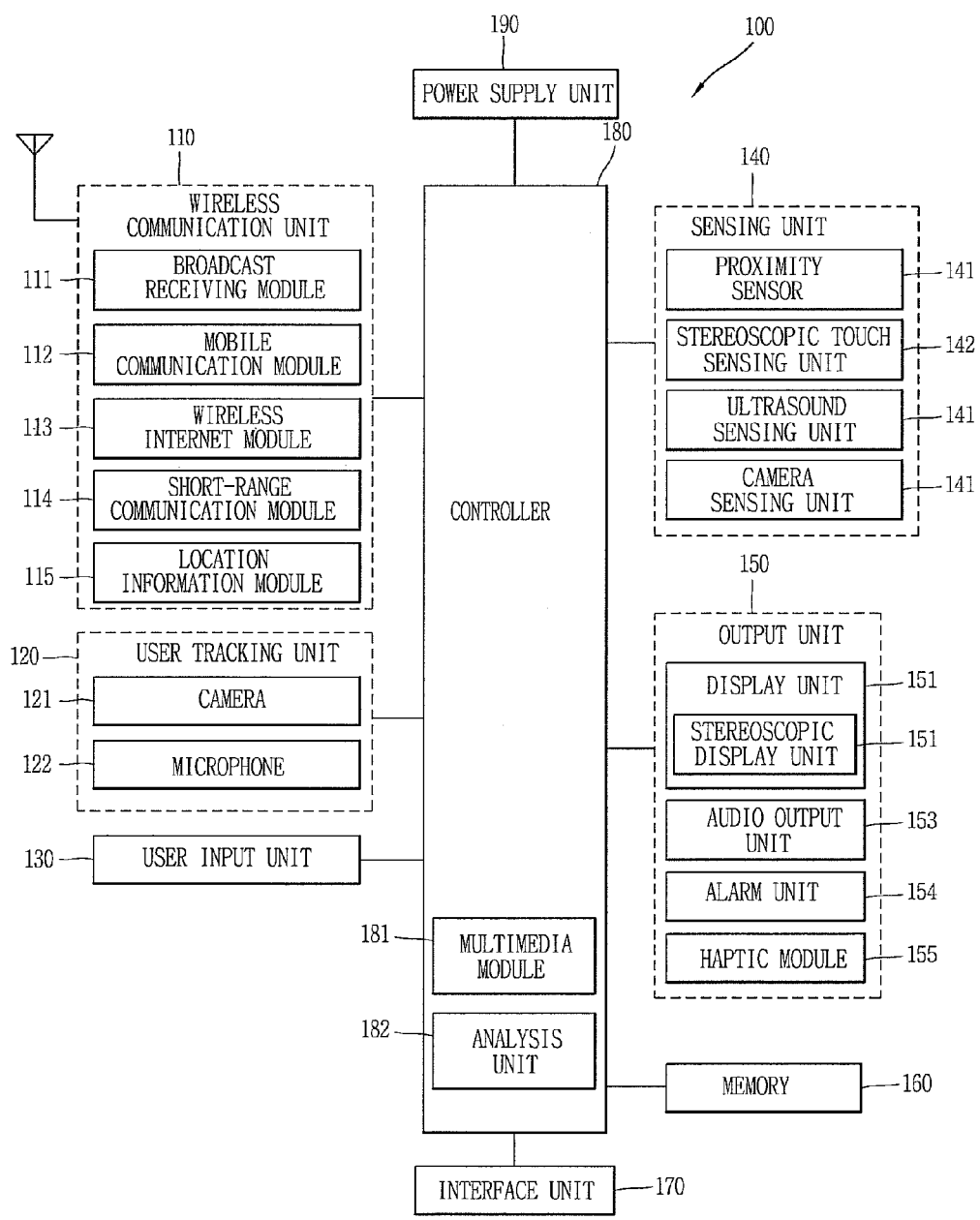
FIG. 1 is a block diagram illustrating a mobile terminal according to an embodiment disclosed in the present disclosure.

Hereinafter, preferred embodiments of the present invention will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present invention, moreover, the detailed description will be omitted when a specific description for publicly known technologies to which the invention pertains is judged to obscure the gist of the present invention.

A mobile terminal disclosed herein may include a mobile phone, a smart phone, a laptop computer, a digital broadcast mobile device, a personal digital assistant (PDA), a mobile multimedia player (PMP), a navigation, a slate PC, a tablet PC, an ultrabook, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 according to an embodiment disclosed in the present disclosure.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the foregoing constituent elements will be described in sequence.

The wireless communication unit 110 may include one or more modules allowing radio communication between the mobile terminal 100 and a wireless communication system, or allowing radio communication between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB- T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems.

Broadcast signals and/or broadcast associated information received via the broadcast receiving module 111 may be stored in a memory 160.

The mobile communication module 112 transmits and receives wireless signals to and from at least one a base station, an external terminal and a server on a mobile communication network. Here, the wireless signals may include audio call signals, video call signals, or various formats of data according to the transmission and reception of text/multimedia messages.

The mobile communication module 112 may be configured to implement an video communication mode and a voice communication mode. The video communication mode refers to a configuration in which communication is made while viewing the image of the counterpart, and the voice communication mode refers to a configuration in which communication is made without viewing the image of the counterpart. The mobile communication module 112 may be configured to transmit or receive at least one of audio or video data to implement the video communication mode and voice communication mode.

The wireless Internet module 113 refers to a module for supporting wireless Internet access, and may be built-in or externally installed on the mobile terminal 100. Here, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth™, Radio Frequency IDentification (RFID), Infrared Data Association (IrDA), Ultra WideBand (UWB), ZigBee, Near Field Communication (NFC) and the like.

The location information module 115 is a module for checking or acquiring the location of the mobile terminal, and there is a Global Positioning Module (GPS) module or Wireless Fidelity (WiFI) as a representative example.

Referring to FIG. 1, the A/V (audio/video) input unit 120 receives an audio or video signal, and the A/V (audio/video) input unit 120 may include a camera 121 and a microphone 122. The camera 121 processes image frames, such as still or moving images, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Furthermore, the user's location information or the like may be produced from image frames acquired from the camera 121. Two or more cameras 121 may be provided according to the use environment.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed configuration of the mobile terminal 100, a location of the mobile terminal 100, a presence or absence of user contact with the mobile terminal 100, an orientation of the mobile terminal 100, an acceleration/deceleration of the mobile terminal 100, and the like, so as to generate a sensing signal for controlling the operation of the mobile terminal 100. For example, when the mobile terminal 100 is a slide phone type, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling between the interface unit 170 and an external device.

The output unit 150 is configured to generate an output associated with visual sense, auditory sense or tactile sense, and may include a display unit 151, an audio output module 153, an alarm unit 154, a haptic module 155, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a mobile terminal body through a region occupied by the display unit 151 of the mobile terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

Furthermore, the display unit 151 may be configured with a stereoscopic display unit 152 for displaying a stereoscopic image.

Here, stereoscopic image indicates a 3-dimensional stereoscopic image, and the 3-dimensional stereoscopic image is an image for allowing the user to feel the gradual depth and reality of an object located on the monitor or screen as in a real space. The 3-dimensional stereoscopic image may be implemented by using binocular disparity. Here, binocular disparity denotes a disparity made by the location of two eyes separated from each other, allowing the user to feel the depth and reality of a stereoscopic image when two eyes see different two-dimensional images and then the images are transferred through the retina and merged in the brain as a single image.

A stereoscopic method (glasses method), an auto-stereoscopic method (no-glasses method), a projection method (holographic method), and the like may be applicable to the stereoscopic display unit 152. The stereoscopic method primarily used in a home television receiver and the like may include a Wheatstone stereoscopic method and the like.

The examples of the auto-stereoscopic method may include a parallel barrier method, a lenticular method, an integral imaging method, and the like. The projection method may include a reflective holographic method, a transmissive holographic method, and the like.

In general, a 3-dimensional stereoscopic image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a 3-dimensional stereoscopic image.

For 3-dimensional thumbnail images, a left image thumbnail and a right image thumbnail may be generated from the left and the right image of the original image frame, and then combined with each other to generate a 3-dimensional stereoscopic image. Typically, thumbnail denotes a reduced image or reduced still video. The left and right thumbnail image generated in this manner are displayed with a left and right distance difference on the screen in a depth corresponding to the disparity of the left and right image, thereby implementing a stereoscopic space feeling.

A left image and a right image required to implement a 3-dimensional stereoscopic image are displayed on the stereoscopic display unit 152 by a stereoscopic processing unit (not shown). The stereoscopic processing unit receives a 3D image to extract a left image and a right image from the 3D image, or receives a 2D image to convert it into a left image and a right image.

On the other hand, when the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Here, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 may sense which region of the display unit 151 has been touched.

Referring to FIG. 1, a proximity sensor 141 may be arranged at an inner region of the mobile device 100 surrounded by the touch screen, or adjacent to the touch screen. The proximity sensor 141 may be provided as an example of the sensing unit 140. The proximity sensor 141 refers to a sensor to sense the presence or absence of an object approaching to a surface to be sensed, or an object disposed adjacent to a surface to be sensed, by using an electromagnetic field or infrared rays without a mechanical contact. The proximity sensor 141 has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this case, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor 141 senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

When the stereoscopic display unit 152 and a touch sensor are configured with an interlayer structure (hereinafter, referred to as a "stereoscopic touch screen") or the stereoscopic display unit 152 and a 3D sensor for detecting a touch operation are combined with each other, the stereoscopic display unit 152 may be used as a 3-dimensional input device.

As an example of the 3D sensor, the sensing unit 140 may include a proximity sensor 141, a stereoscopic touch sensing unit 142, a ultrasound sensing unit 143, and a camera sensing unit 144.

The proximity sensor 141 measures a distance between the sensing object (for example, the user's finger or stylus pen) and a detection surface to which a touch is applied using an electromagnetic field or infrared rays without a mechanical contact. The terminal may recognize which portion of a stereoscopic image has been touched by using the measured distance. In particular, when the touch screen is implemented with a capacitance type, it may be configured such that the proximity level of a sensing object is sensed by changes of an electromagnetic field according to the proximity of the sensing object to recognize a 3-dimensional touch using the proximity level.

The stereoscopic touch sensing unit 142 may be configured to sense the strength or duration time of a touch applied to the touch screen. For example, stereoscopic touch sensing unit 142 senses a user applied touch pressure, and if the applied pressure is strong, then the stereoscopic touch sensing unit 142 recognizes it as a touch for an object located farther from the touch screen.

The ultrasound sensing unit 143 may be configured to sense the location of the sensing object using ultrasound.

For example, the ultrasound sensing unit 143 may be configured with an optical sensor and a plurality of ultrasound sensors. The optical sensor may be formed to sense light, and the ultrasound sensor may be formed to sense ultrasound waves. Since light is far faster than ultrasound waves, the time for light to reach the optical sensor is far faster than the time for ultrasound waves to reach the ultrasound sensor. Accordingly, the location of the wave generating source may be calculated using a time difference between the light and ultrasound waves to reach the optical sensor.

The camera sensing unit 144 may include at least one of a camera 121, a photo sensor, and a laser sensor.

For example, the camera 121 and laser sensor may be combined to each other to sense a touch of the sensing object to a 3-dimensional stereoscopic image. Distance information sensed by the laser sensor is added to a two-dimensional image captured by the camera to acquire 3-dimensional information.

For another example, a photo sensor may be deposited on the display element. The photo sensor may be configured to scan the motion of the sensing object in proximity to the touch screen. More specifically, the photo sensor is integrated with photo diodes and transistors in the rows and columns thereof, and a content placed on the photo sensor may be scanned by using an electrical signal that is changed according to the amount of light applied to the photo diode. In other words, the photo sensor performs the coordinate calculation of the sensing object according to the changed amount of light, and the location coordinate of the sensing object may be detected through this.

The audio output module 153 may output audio data received from the wireless communication unit 110 or stored in the memory 160, in a call-receiving mode, a call-placing mode, a recording mode, a voice recognition mode, a broadcast reception mode, and so on. The audio output module 153 may output audio signals relating to the functions performed in the mobile terminal 100 (e.g., sound alarming a call received or a message received, and so on). The audio output module 153 may include a receiver, a speaker, a buzzer, and so on.

The alarm 154 outputs signals notifying occurrence of events from the mobile terminal 100. The events occurring from the mobile terminal 100 may include call received, message received, key signal input, touch input, and so on. The alarm 154 may output not only video or audio signals, but also other types of signals such as signals notifying occurrence of events in a vibration manner. Since the video or audio signals can be output through the display unit 151 or the audio output unit 153, the display unit 151 and the audio output module 153 may be categorized into part of the alarm 154.

The haptic module 155 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

On the other hand, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Furthermore, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

Furthermore, the controller 180 can perform a pattern recognition processing so as to recognize writing or drawing input carried out on the touch screen as text or image.

Furthermore, the controller 180 may implement a lock state for limiting the user's control command input to applications when the state of the mobile terminal satisfies a preset condition. Furthermore, the controller 180 may control a lock screen displayed in the lock state based on a touch input sensed through the display unit 151 in the lock state.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions described in the present disclosure may be implemented with separate software modules. Each of the software modules may perform at least one function or operation described in the present disclosure.

Software codes can be implemented by a software application written in any suitable programming language. The software codes may be stored in the memory 160 and executed by the controller 180.

Next, a communication system that can be implemented through the mobile terminal 100 according to the present disclosure will be described.

Figure 2A:
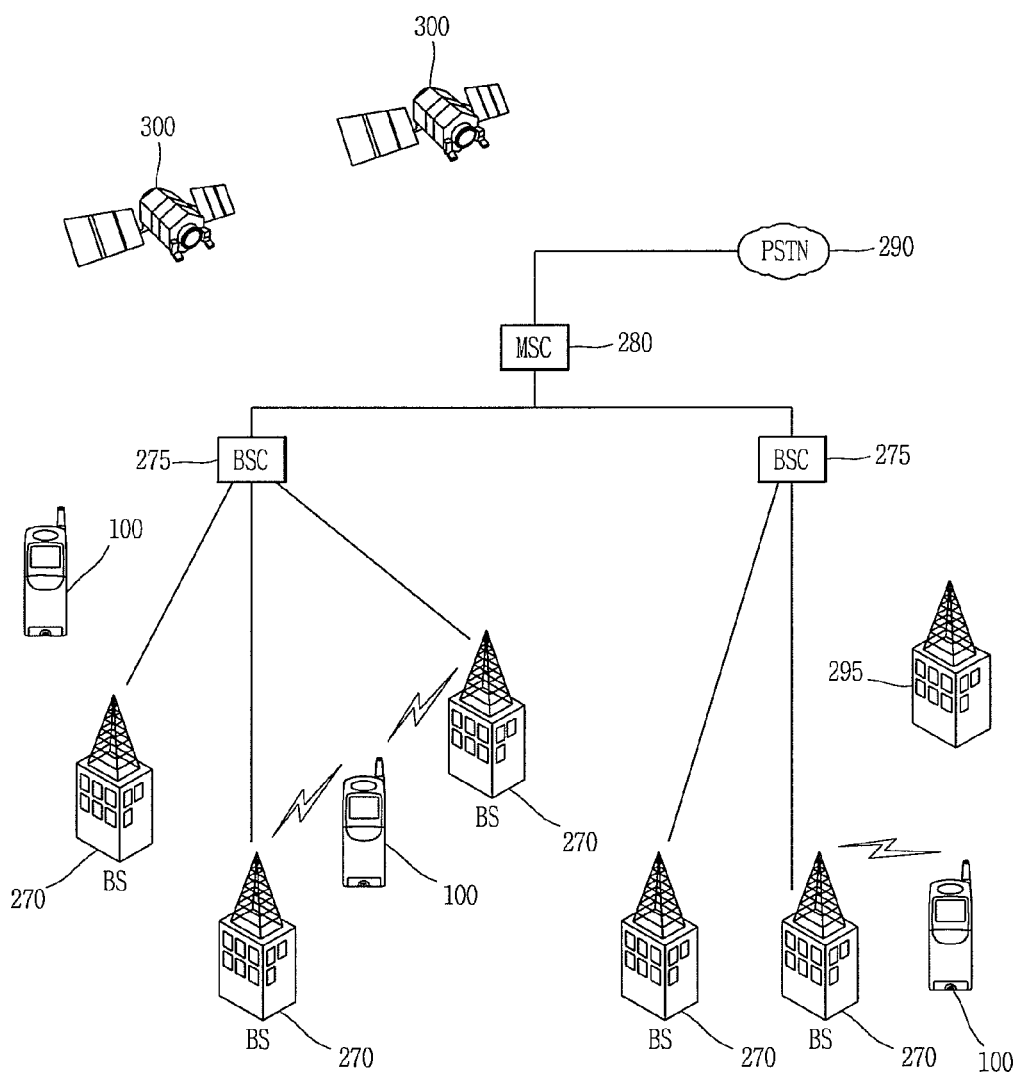
FIGS. 2A and 2B are conceptual views illustrating a communication system in which a mobile terminal according to the present disclosure is operable.
Figure 2B:
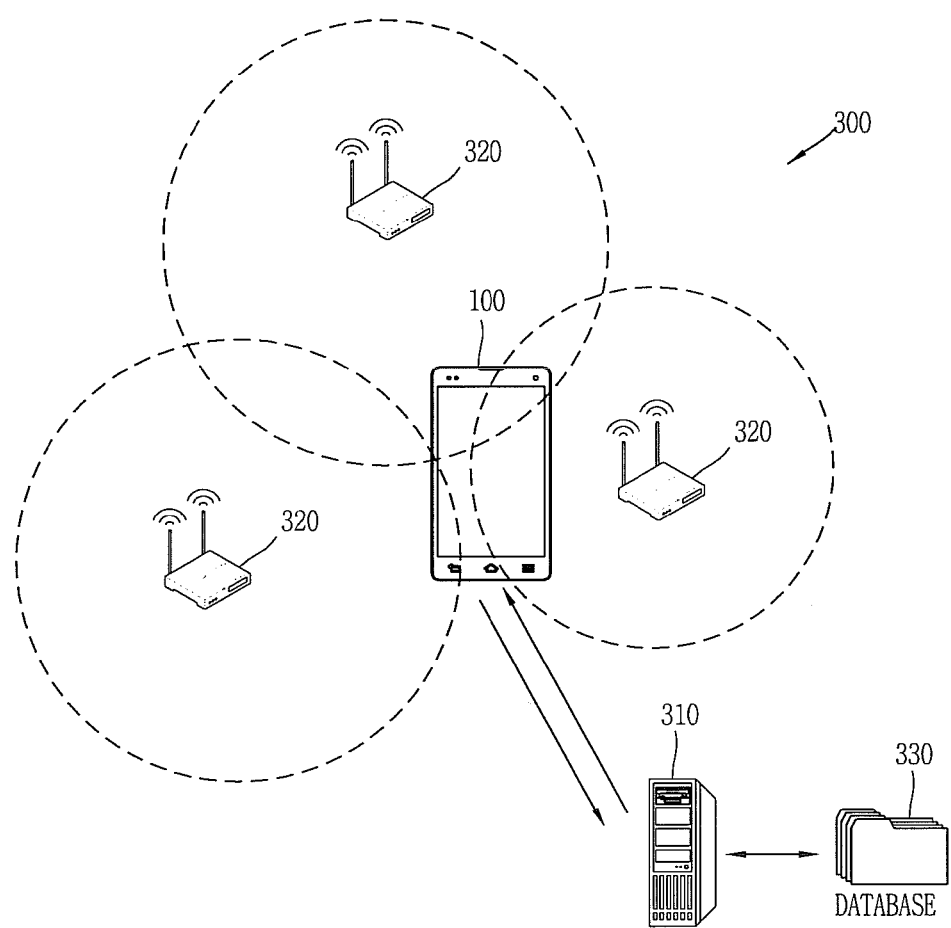

FIGS. 2A and 2B are conceptual views illustrating a communication system in which a mobile terminal 100 according to the present disclosure is operable.

First, referring to FIG. 2A, the communication system may use different wireless interfaces and/or physical layers. For example, wireless interfaces that can be used by the communication system may include, frequency division multiple access (FDMA), time division multiple access (TDMA), code division multiple access (CDMA), universal mobile telecommunications system (UMTS) (particularly, long term evolution (LTE)), global system for mobile communications (GSM), and the like.

Hereinafter, for the sake of convenience of explanation, the description disclosed herein will be limited to CDMA. However, it is apparent that the present invention may be also applicable to all communication systems including a CDMA wireless communication system.

As illustrated in FIG. 2A, a CDMA wireless communication system may include a plurality of terminals 100, a plurality of base stations (BSs) 270, a plurality of base station controllers (BSCs) 275, and a mobile switching center (MSC) 280. The MSC 280 may interface with a Public Switched Telephone Network (PSTN) 290, and the MSC 280 may also interface with the BSCs 275. The BSCs 275 may be connected to the BSs 270 via backhaul lines. The backhaul lines may be configured in accordance with at least any one of E1/T1, ATM, IP, PPP, Frame Relay, HDSL, ADSL, or xDSL, for example. Further, the system illustrated in FIG. 2A may include a plurality of BSCs 275.

Each of the plurality of BSs 270 may include at least one sector, each sector having an omni-directional antenna or an antenna indicating a particular radial direction from the base station 270. Alternatively, each sector may include two or more antennas with various forms. Each of the BSs 270 may be configured to support a plurality of frequency assignments, each frequency assignment having a particular spectrum (for example, 1.25 MHz, 5 MHz, etc.).

The intersection of a sector and frequency assignment may be referred to as a CDMA channel. The BSs 270 may also be referred to as Base Station Transceiver Subsystems (BTSs). In this case, the term "base station" may collectively refer to a BSC 275, and at least one BS 270. The base stations may also indicate "cell sites". Alternatively, individual sectors for a specific BS 270 may also be referred to as a plurality of cell sites.

As illustrated in FIG. 2A, the Broadcasting Transmitter (BT) 295 may transmit broadcasting signals to the mobile terminals 100 being operated within the system. The broadcast receiving module 111 as illustrated in FIG. 1 may be provided in the mobile terminal 100 to receive broadcast signals transmitted by the BT 295.

In addition, FIG. 2A illustrates several global positioning system (GPS) satellites 300. Such satellites 300 facilitate locating at least one of a plurality of mobile terminals 100. Though two satellites are illustrated in FIG. 2A, location information may be obtained with a greater or fewer number of satellites. The location information module 115 as illustrated in FIG. 1 may cooperate with the satellites 300 as illustrated in FIG. 2A to obtain desired location information. However, other types of position detection technology, all types of technologies capable of tracing the location may be used in addition to a GPS location technology. Furthermore, at least one of the GPS satellites 300 may alternatively or additionally provide satellite DMB transmissions.

During the operation of a wireless communication system, the BS 270 may receive reverse-link signals from various mobile terminals 100. At this time, the mobile terminals 100 may perform calls, message transmissions and receptions, and other communication operations. Each reverse-link signal received by a specific base station 270 may be processed within that specific base station 270. The processed resultant data may be transmitted to an associated BSC 275. The BSC 275 may provide call resource allocation and mobility management functions including the systemization of soft handoffs between the base stations 270. Furthermore, the BSCs 275 may also transmit the received data to the MSC 280, which provides additional transmission services for interfacing with the PSTN 290. Furthermore, similarly, the PSTN 290 may interface with the MSC 280, and the MSC 280 may interface with the BSCs 275. The BSCs 275 may also control the BSs 270 to transmit forward-link signals to the mobile terminals 100.

Next, a method of acquiring the location information of a mobile terminal using a WiFi (Wireless Fidelity) positioning system (WPS) will be described with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Hereinafter, a mobile terminal according to an embodiment of the present disclosure as illustrated in FIG. 1 or a mobile terminal disposed with the constituent elements of the mobile terminal or the structure of a mobile terminal will be described.

Figure 3A:
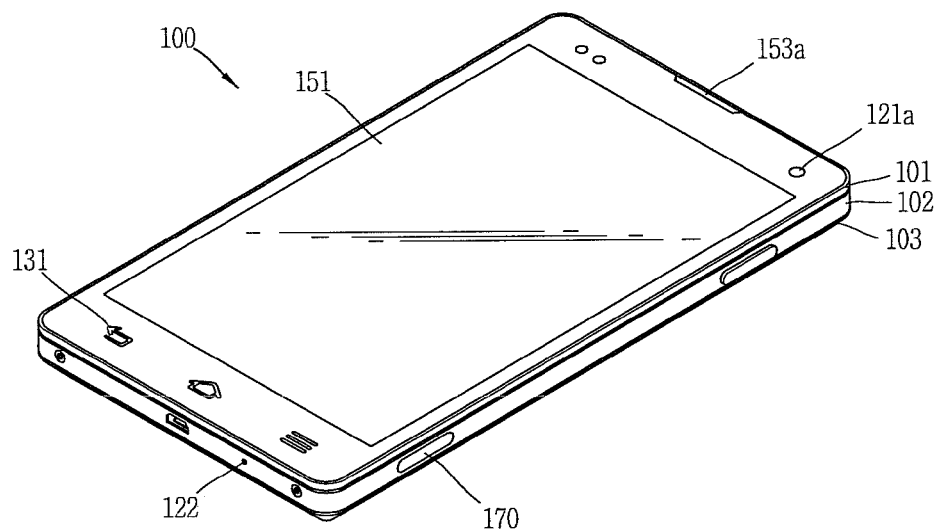
FIG. 3A is a front perspective view illustrating an example of a mobile terminal associated with the present disclosure.

FIG. 3A is a front perspective view illustrating an example of the mobile terminal 100 associated with the present disclosure.

The mobile terminal 100 disclosed herein is provided with a bar-type terminal body. However, the present invention may not be limited to this, but also may be applicable to various structures such as watch type, clip type, glasses type or folder type, flip type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components is incorporated into a space formed between the front case 101 and the rear case 102. At least one middle case may be additionally disposed between the front case 101 and the rear case 102, and a battery cover 103 for covering the battery 191 may be detachably configured at the rear case 102.

The cases may be formed by injection-molding a synthetic resin or may be also formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing means to receive a control command by a touch method. When a touch is made to any one place on the display unit 151, the touch sensing means may be configured to sense this touch and enter the content corresponding to the touched place. The content entered by a touch method may be a text or numerical value, or a menu item capable of indication or designation in various modes.

The touch sensing means may be formed with transparency to allow visual information displayed on the display unit 151 to be seen, and may include a structure for enhancing the visibility of a touch screen at bright places. Referring to FIG. 3A, the display unit 151 occupies a most portion of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this case, a hole independently formed to output audio sounds may not be seen or hidden in terms of appearance, thereby further simplifying the appearance of the mobile terminal 100.

However, the present invention may not be limited to this, but a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as a Subscriber Identification Module (SIM) or User Identity Module (UIM), and a memory card for information storage.

Figure 3B:
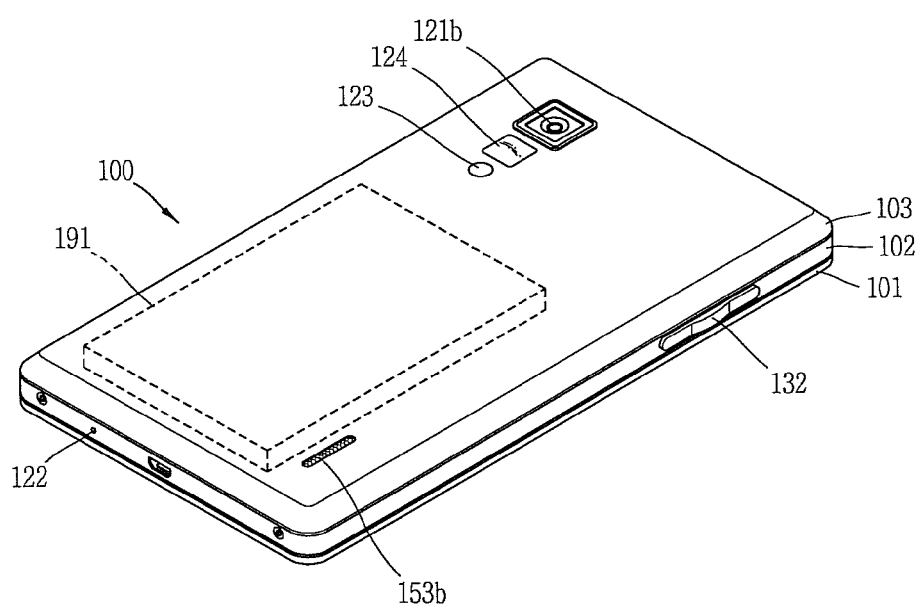
FIG. 3B is a rear perspective view illustrating a mobile terminal illustrated in FIG. 3A.

FIG. 3B is a rear perspective view illustrating mobile terminal 100 illustrated in FIG. 3A.

Referring to FIG. 3B, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 3A) can implement a stereo function, and may be also used to implement a speaker phone mode during a phone call.

An antenna (not shown) for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

On the other hand, the mobile terminal 100 may reproduce a content. When a control command for reproducing the content again is sensed after pausing the reproduction of the content, the terminal may reproduce the content from a time point where the reproduction of the content is paused. However, from the standpoint of the user, he or she may have inconvenience in which the continuation of the content is interrupted.

Accordingly, a mobile terminal mobile terminal 100 and a control method thereof capable of enhancing the user's convenience in reproducing a content again after pausing the reproduction of the content will be described below with reference to the accompanying drawings.

Figure 4:
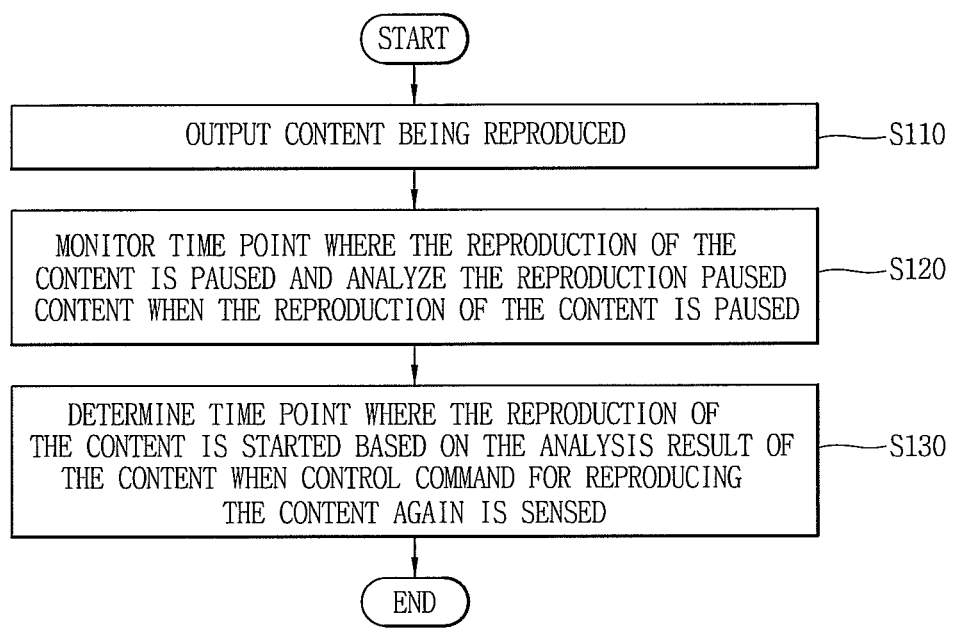
FIG. 4 is a flow chart for explaining a mobile terminal according to an embodiment of the present disclosure.

FIG. 4 is a flow chart for explaining a mobile terminal according to an embodiment of the present disclosure. The mobile terminal 100 may include an output unit 150 (refer to FIG. 1), an analysis unit 182 (refer to FIG. 1), and a controller 180 (refer to FIG. 1).

Referring to FIG. 4, the process (S110) of outputting a content being reproduced is carried out.

The output unit 150 of the mobile terminal 100 may output a content. Here, the content refers to various information or subject matters being output through the mobile terminal 100, computer or the like. The content may be provided to the mobile terminal 100, computer or the like through the Internet or computer communication and the like. The content may include at least one of video data and audio data.

The output unit 150 may include at least one of the display unit 151 (refer to FIG. 1) formed to output the video data and the audio output unit 153 (refer to FIG. 1) formed to output the audio data.

Next, the process (120) of monitoring a time point where the reproduction of the content is paused and analyzing the reproduction paused content when the reproduction of the content is paused is carried out.

Specifically, when a control command for pausing the reproduction of the content is sensed, the controller 180 may pause the reproduction of the content. For example, when a touch input is applied to a pause button displayed on the display unit 151 or an input is applied to the user input unit 130 (refer to FIG. 1), a control command for pausing the reproduction of the content may be sensed.

When the reproduction of the content is paused, the analysis unit 182 may monitor a time point where the reproduction of the content is paused. The analysis unit 182 may analyze the attribute of the content corresponding to a period from a time point where the reproduction of the content is paused to a preset time point.

More specifically, the analysis unit 182 may analyze objects contained in video data corresponding to a period up to the preset time point. According to the analysis result of objects, the controller 180 may detect a time point where the scene is changed.

Furthermore, the analysis unit 182 may analyze a change of at least one of an oscillation frequency, a wave shape and an amplitude of the audio data corresponding to the period up to the preset time point. According to the analysis result, the controller 180 may detect a time where the word is terminated, a time point where the sentence is terminated, or the like and moreover detect a time point where the voice is changed.

Then, the process (S130) of determining a time point where the reproduction of the content is started based on the analysis result of the content when a control command for reproducing the content again is sensed is carried out.

Specifically, when a control command for reproducing the content again is sensed, the controller 180 may reproduce the content again. For example, when a touch input is applied to a play button displayed on the display unit 151 or an input is applied to the user input unit 130, a control command for reproducing the content again may be sensed.

The controller 180 may detect time points where the attribute of the content is changed. Then, the controller 180 may determine a time point the closest to the time point where the reproduction of the content is paused among the detected time points as a time point where the reproduction of the content is started.

More specifically, when a control command for reproducing a content as video data again is sensed, the controller 180 may determine a time point the closest to the time point where the reproduction of the content is paused among the time points where the scene of video data is changed as a time point where the reproduction of the content is started.

Furthermore, when a control command for reproducing a content as audio data again is sensed, the controller 180 may determine a time point the closest to the time point where the reproduction of the content is paused among the time points where the background music is changed as a time point where the reproduction of the content is started.

In addition, when reproduction is paused while outputting a word through the audio output unit 153, the controller 180 may determined a starting point of the word as a time point where the reproduction of the content is started.

As described above, according to the present disclosure, when a control command for reproducing a content again after pausing the reproduction of the content, the mobile terminal 100 may determine a time point where the reproduction of the content is started based on the analysis result of the content. Accordingly, the user may continuously enjoy the content while the continuance of the enjoyed content is not interrupted. Furthermore, even when the user does not select a separate reproduction start time point on the time line object, the reproduction of the content can be started from a time point optimized for the user. As a result, it may be possible to enhance the user's convenience.

Figure 5:
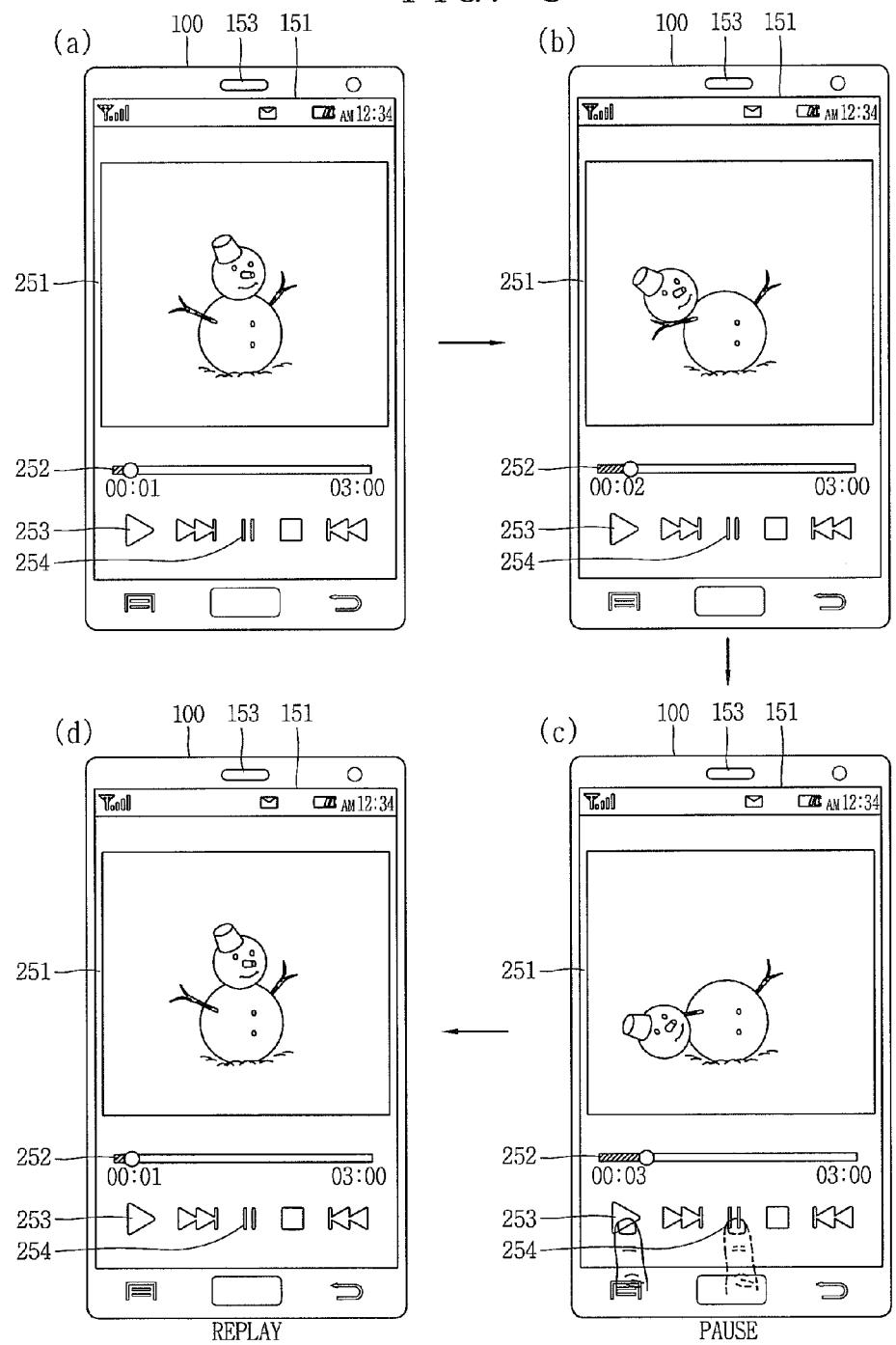
FIGS. 5 and 6 are conceptual views illustrating a user interface associated with the reproduction of video data according to an embodiment of the present disclosure.
Figure 6:
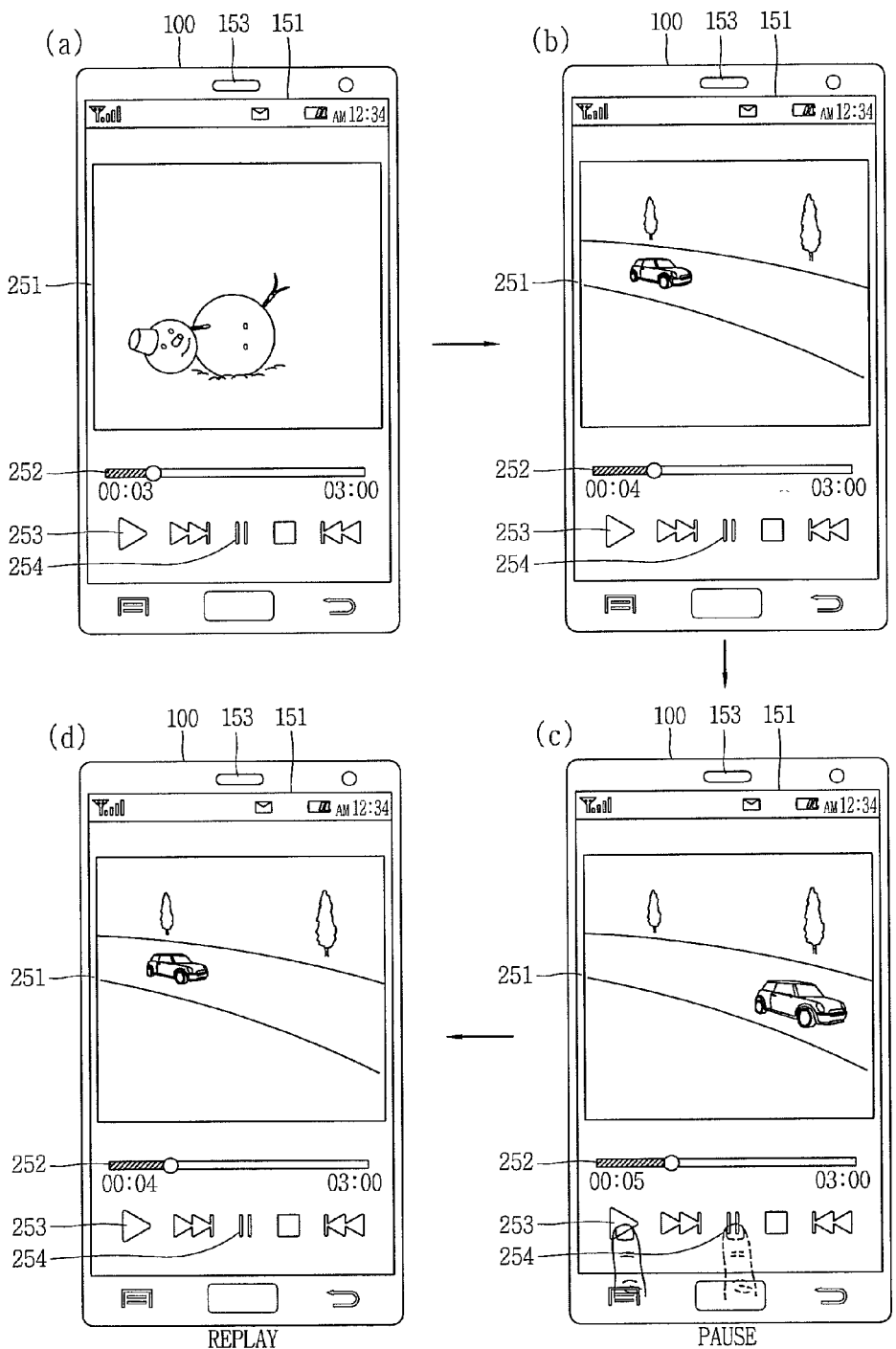

FIGS. 5 and 6 are conceptual views illustrating a user interface associated with the reproduction of video data according to an embodiment of the present disclosure. The mobile terminal 100 may include an output unit 150 (refer to FIG. 1), an analysis unit 182 (refer to FIG. 1), and a controller 180 (refer to FIG. 1). The output unit 150 may include at least one of the display unit 151 and the audio output unit 153.

Referring to FIGS. 5A and 5B, the display unit 151 may output a content 251 being reproduced. As illustrated in the drawing, the display unit 151 may display a time line object 252, a play button 253 and a pause button 254 at the same time. The time line object 252 may be displayed on the display unit 151 in the form of a progress bar to display time point of reproducing the content.

As illustrated in the drawing, the time line object 252 may be always displayed together with the content 251 on the display unit 151. Though not shown in the drawing, the time line object 252 may be displayed together with the content 251 in response to a touch input applied to the display unit 151.

Next, referring to FIG. 5C, when the pause button 254 is touched, the controller 180 may pause the reproduction of the content 251. At this time, the analysis unit 182 may monitor a time point where the reproduction of the content 251 is paused and analyze the reproduction paused content 251. At this time, the analysis unit 182 may analyze the attribute of the content corresponding to a period from a time point where the reproduction of the content 251 is paused to a preset time point.

For example, the analysis unit 182 may analyze objects (for example, snowman) contained in video data being output during a period from 1 to 3 seconds, and detect a time point (for example, none) corresponding to a period from a time point where the reproduction of the content 251 is paused to a preset time point.

Then, when the play button 253 is touched, referring to FIG. 5D, the controller 180 may determine a time point where the reproduction of the content is started based on the analysis result of the content 251. As illustrated in FIGS. 5A through 5C, the controller 180 may reproduce the video data of the content 251 being output from 1 second again since there is no time point where the scene is changed after reproducing the content 251.

On the other hand, referring to FIGS. 6A through 6C, when the pause button 254 is touched, the controller 180 may pause the reproduction of the content 251. The analysis unit 182 may analyze objects (for example, snowman) contained in video data being output during a period from 1 to 3 seconds and objects (for example, automobile, tree) contained in video data being output during a period from 4 to 5 seconds, and detect a time point (for example, 4 seconds) where the scene is changed based on the analysis result.

Then, when the play button 253 is touched, referring to FIG. 6D, the controller 180 may determine a time point where the reproduction of the content 251 is started based on the analysis result of the content 251. As illustrated in FIGS. 6A through 6C, the controller 180 may reproduce the video data of the content 251 being output from 4 seconds again since the scene is changed from 4 seconds.

Figure 7:
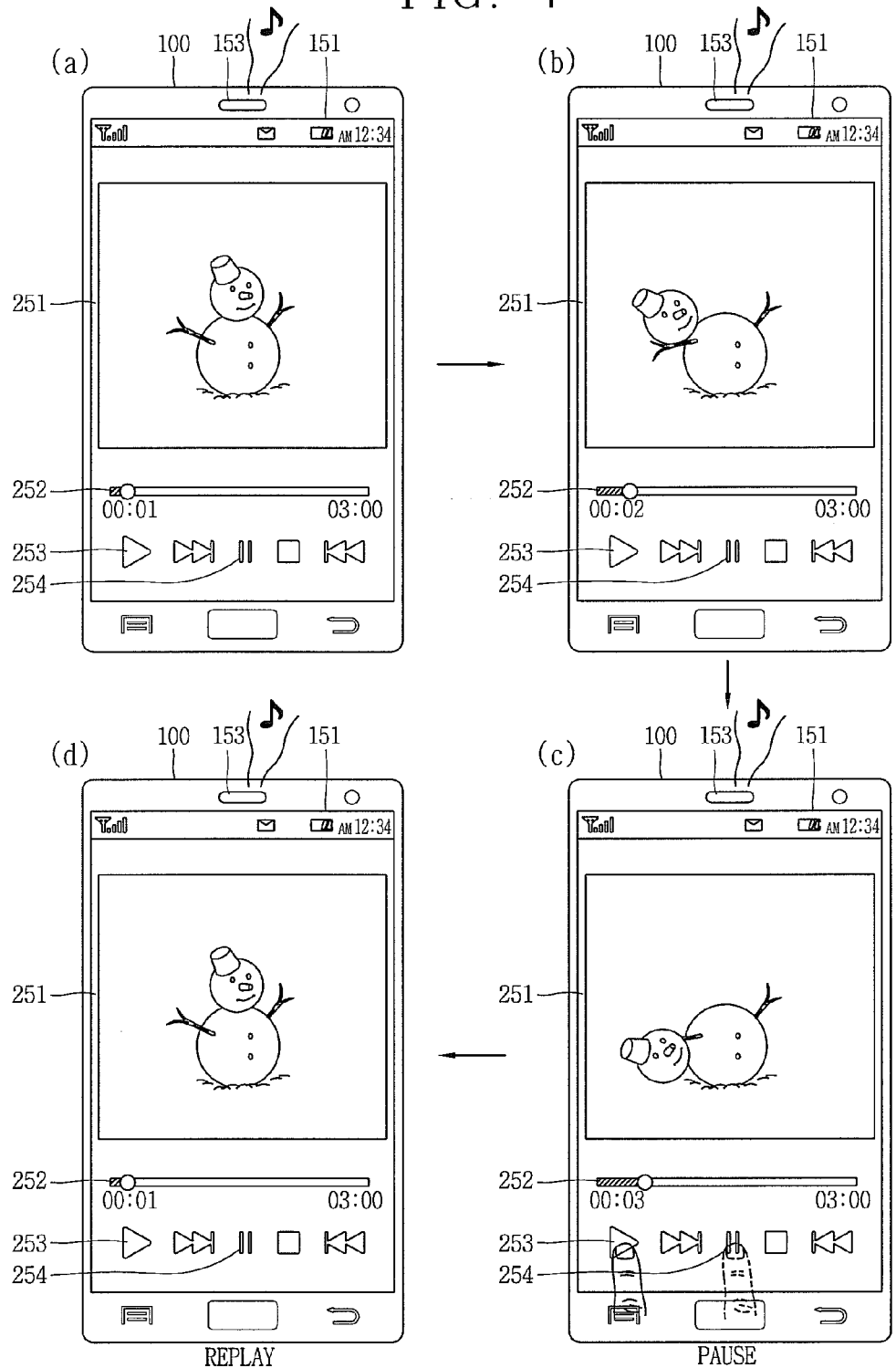
Figure 8:
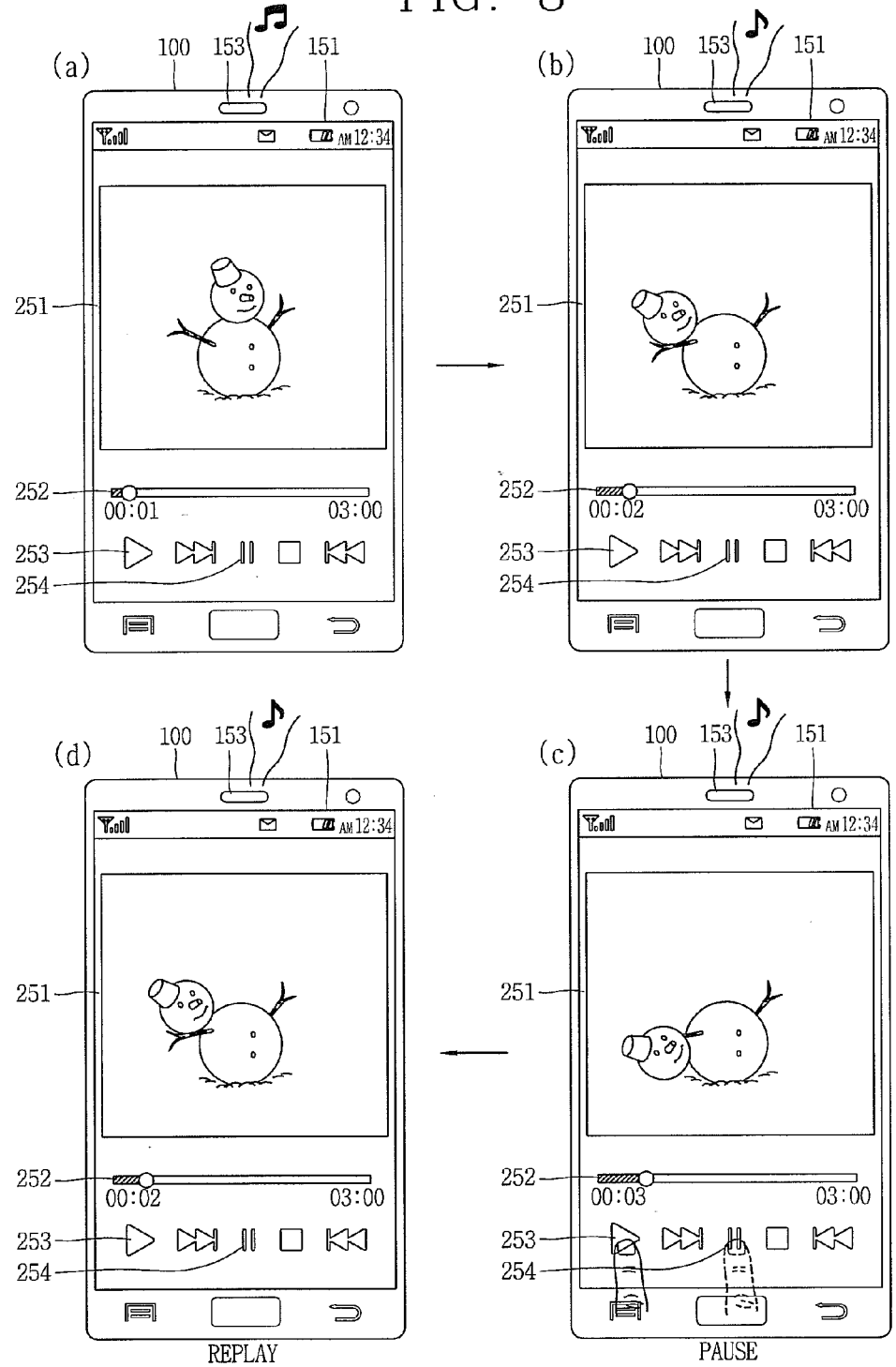

FIGS. 7 through 9 are conceptual view illustrating a user interface associated with the reproduction of audio data according to an embodiment of the present disclosure. The mobile terminal 100 may include an output unit 150 (refer to FIG. 1), an analysis unit 182 (refer to FIG. 1), and a controller 180 (refer to FIG. 1). The output unit 150 may include at least one of the display unit 151 and the audio output unit 153.

Referring to FIGS. 7A and 7B, the audio output unit 153 may output the audio data of the content 251 being reproduced. At the same time, the display unit 151 may output the video data of the content 251 being reproduced.

Next, Referring to FIG. 7C, when the pause button 254 is touched, the controller 180 may pause the reproduction of the content 251. At this time, the analysis unit 182 may analyze a change of at least one of an oscillation frequency, a wave shape and an amplitude of the audio data being output during a period from 1 to 3 seconds, and detect a time point (for example, none) where the background music is changed based on the analysis result.

Then, when the play button 253 is touched, referring to FIG. 7D, the controller 180 may determine a time point where the reproduction of the content is started based on the analysis result of the content 251. As illustrated in FIGS. 7A through 7C, the controller 180 may reproduce the audio data and video data of the content 251 being output from 1 second again since there is no time point where the background music is changed after reproducing the content 251.

On the other hand, referring to FIGS. 8A through 8C, when the pause button 254 is touched, the controller 180 may pause the reproduction of the content 251. The analysis unit 182 may analyze a change of at least one of an oscillation frequency, a wave shape and an amplitude of the audio data being output during a period from 1 to 3 seconds, and detect a time point (for example, 2 seconds) where the background music is changed based on the analysis result.

Then, when the play button 253 is touched, referring to FIG. 8D, the controller 180 may determine a time point where the reproduction of the content is started based on the analysis result of the content 251. As illustrated in FIGS. 8A through 8C, the controller 180 may reproduce the audio data and video data of the content 251 being output from 2 second again since the background music is changed from 2 seconds after reproducing the content 251.

Though there is illustrated an embodiment in which a time point where the reproduction of the content 251 is started is determined according to whether or not the background music is changed in FIGS. 7 and 8, the controller 180 may determine a time point where the reproduction of the content 251 is started by considering a change of the scene as well as the background music.

Referring to FIG. 9A, the audio output unit 153 may output a content, for example, audio data.

At this time, when a control command for pausing the reproduction of the content is sensed, the analysis unit 182 may monitor a time point (d1) where the reproduction of the content is paused and analyze the attribute of the content corresponding to a period from the time point (d1) where the reproduction of the content is paused to a preset time point. For example, the analysis unit 182 may detect that reproduction is currently paused while outputting a word through the audio output unit 153.

Next, referring to FIG. 9B, when a control command for reproducing a content again is sensed, the controller 180 may detect a start time point (d2) of the word based on the analysis result. Then, the controller 180 may determine the start time point (d2) of the word as a time point where the reproduction of the content is started.

Figure 10:
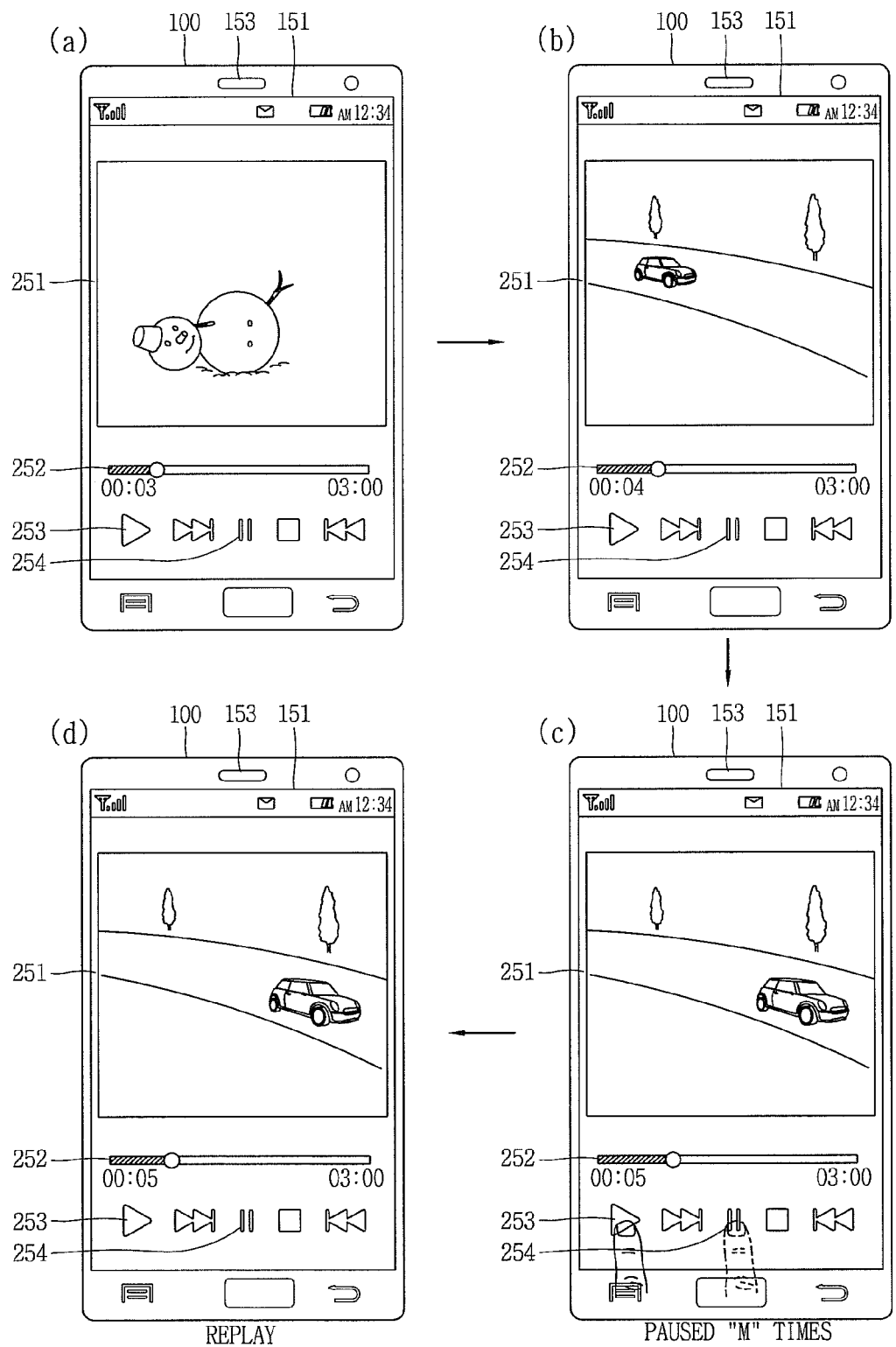
FIGS. 10 and 11 are conceptual views illustrating a user interface according to number-of-times information in which the reproduction of the content is paused.
Figure 11:
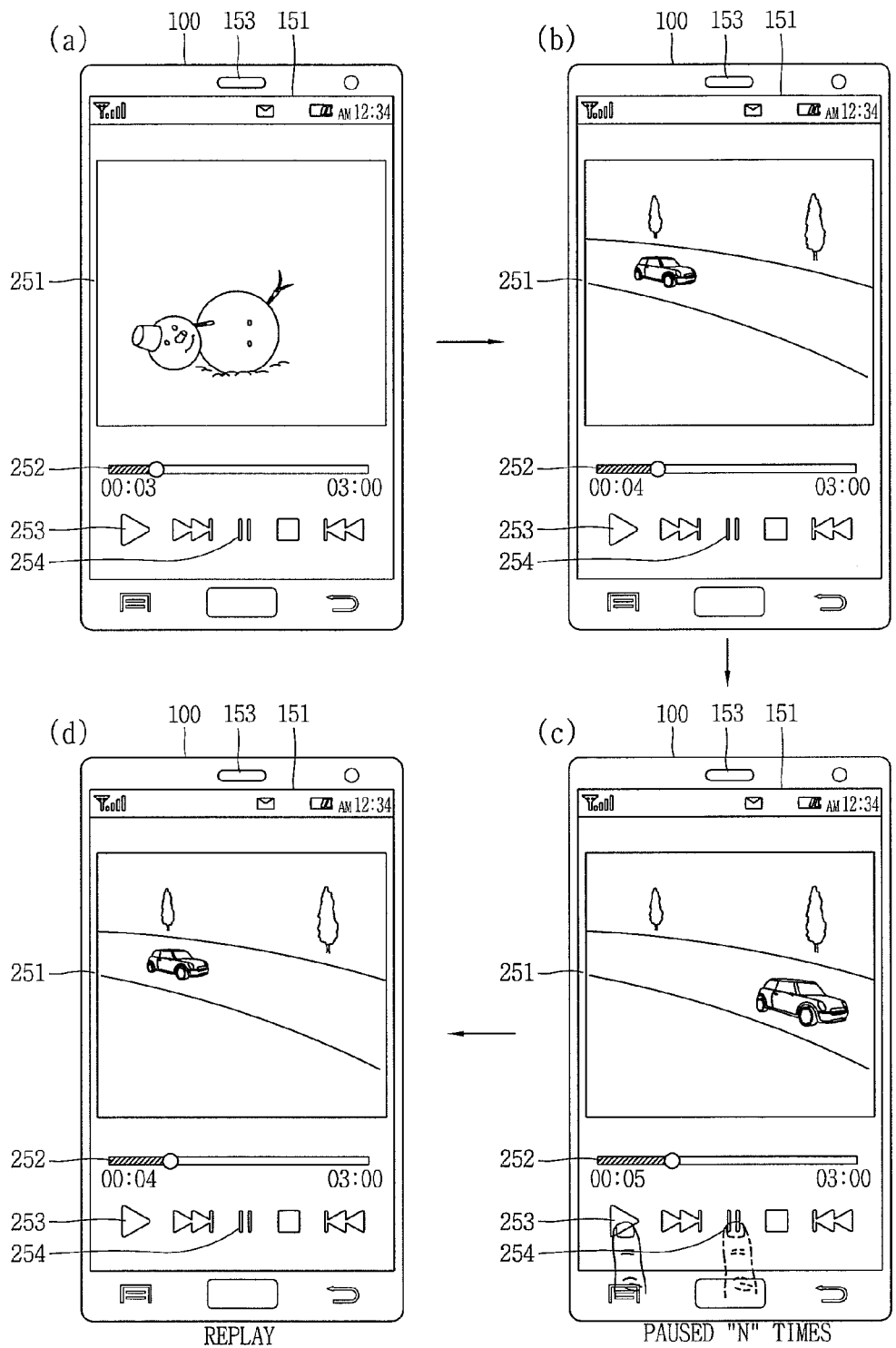

FIGS. 10 and 11 are conceptual views illustrating a user interface according to number-of-times information in which the reproduction of the content is paused. The mobile terminal 100 may include an output unit 150 (refer to FIG. 1), an analysis unit 182 (refer to FIG. 1), and a controller 180 (refer to FIG. 1). The output unit 150 may include at least one of the display unit 151 and the audio output unit 153.

Referring to FIGS. 10A through 10C and 11A through 11C, the display unit 151 may output the content 251 being reproduced.

When the pause button 254 is touched while reproducing the content 251, the controller 180 may pause the reproduction of the content 251. The analysis unit 182 may analyze objects (for example, snowman) contained in video data being output during a period from 1 to 3 seconds and objects (for example, automobile, tree) contained in video data being output during a period from 4 to 5 seconds, and detect a time point (for example, 4 seconds) where the scene is changed based on the analysis result.

Then, when the play button 253 is touched, the controller 180 may determine a time point where the reproduction of the content 251 is started based on number-of-times information in which the reproduction of the content is paused.

Specifically, referring to FIG. 10D, when number-of-times information in which the reproduction of the content 251 is paused corresponds to preset number-of-times information (for example, "m" times), the controller 180 may determine a time point where the reproduction of the content 251 is paused as a time point where the reproduction of the content 251 is started. Accordingly, when the reproduction of the content 251 is frequently paused more than a preset number of times, the controller 180 may reproduce the content 251 again from a time point where the reproduction of the content 251 is paused.

On the other hand, referring to FIG. 11D, when number-of-times information in which the reproduction of the content 251 is paused corresponds to preset number-of-times information (for example, "n" times), the controller 180 may determine a time point where the reproduction of the content 251 is started based on the analysis result of the content 251 as illustrated in FIGS. 5 through 9.

Figure 12:
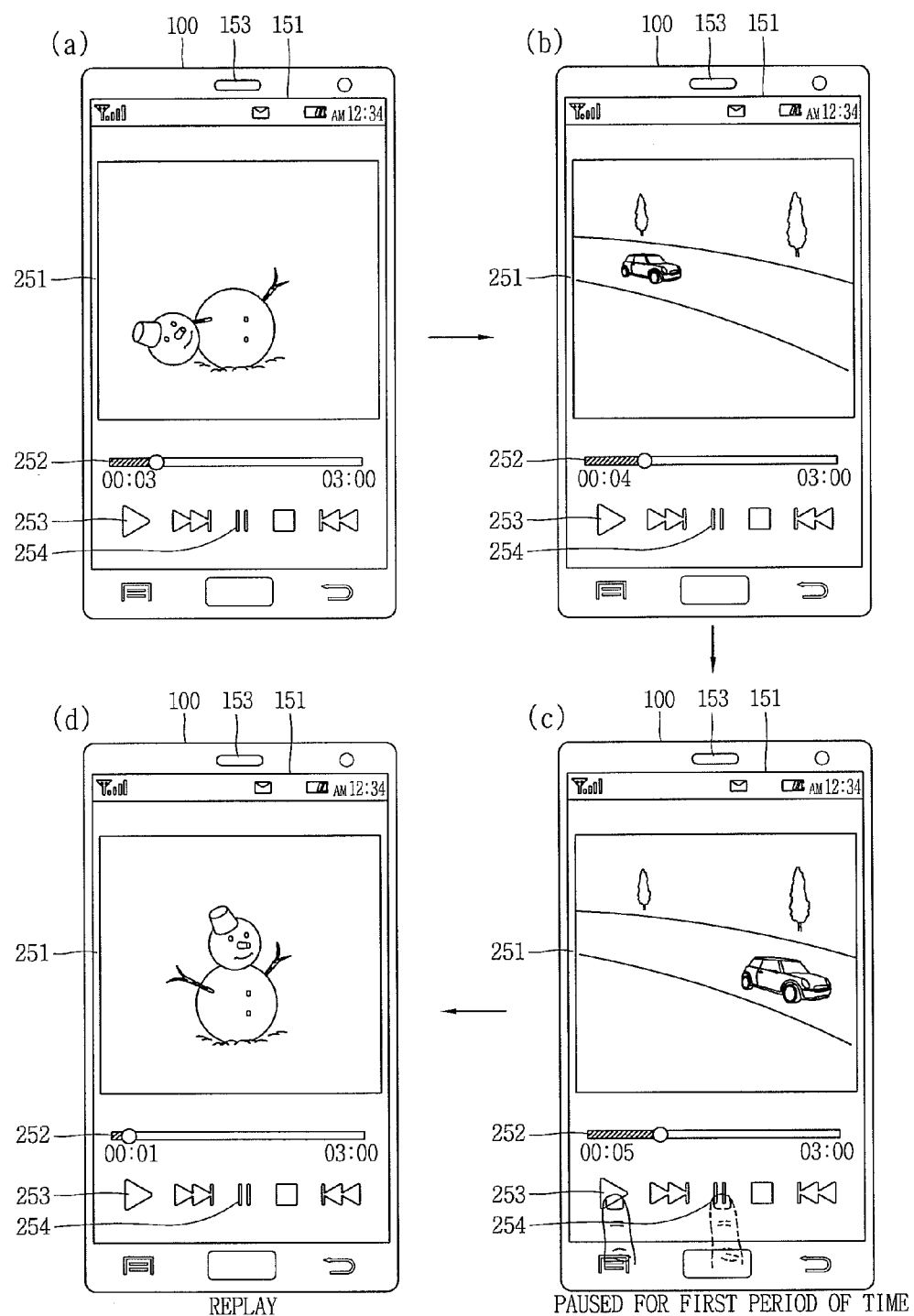
FIGS. 12 through 14 are conceptual views illustrating a user interface according to time information for which the reproduction of the content has been paused.
Figure 13:
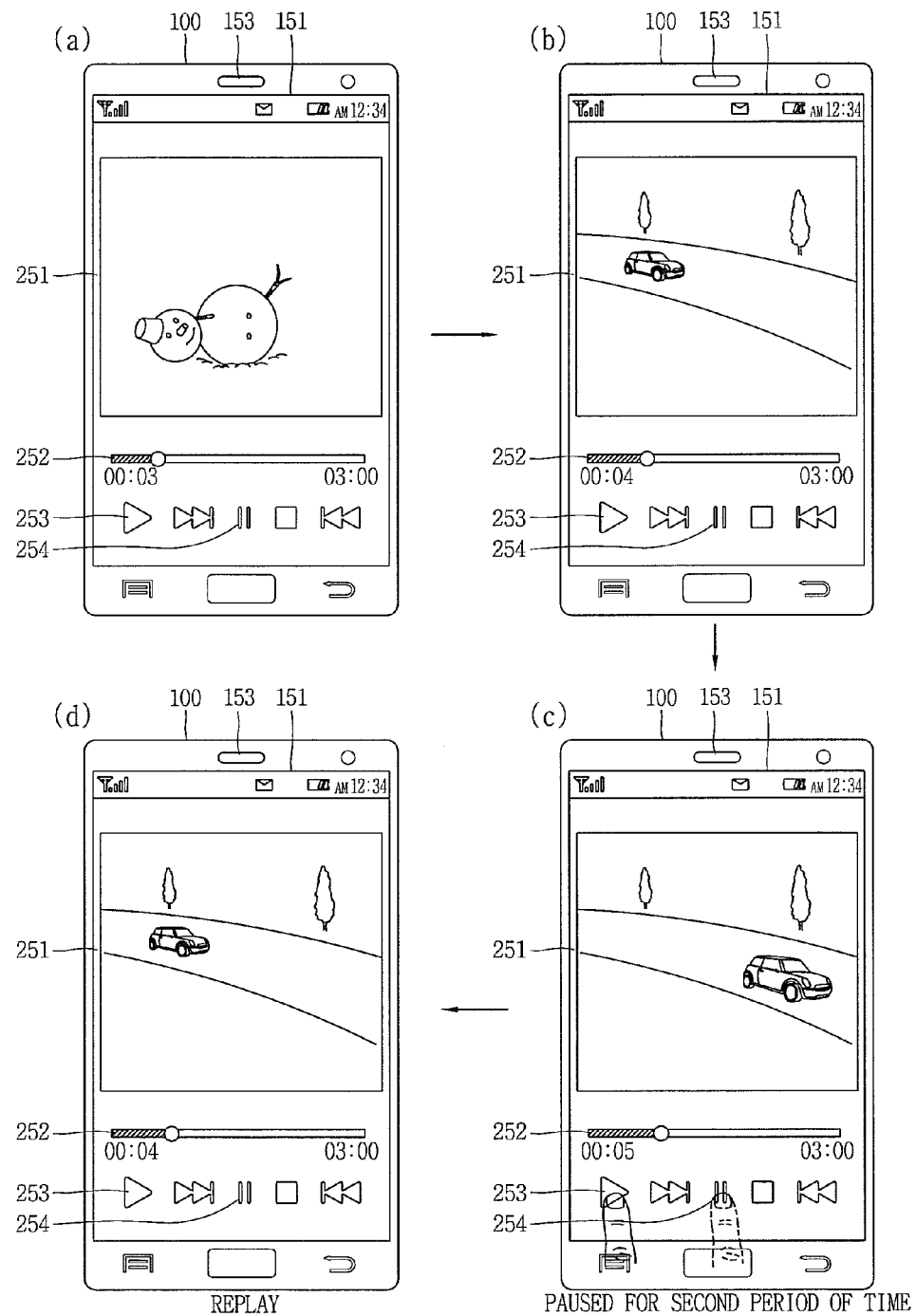
Figure 14:
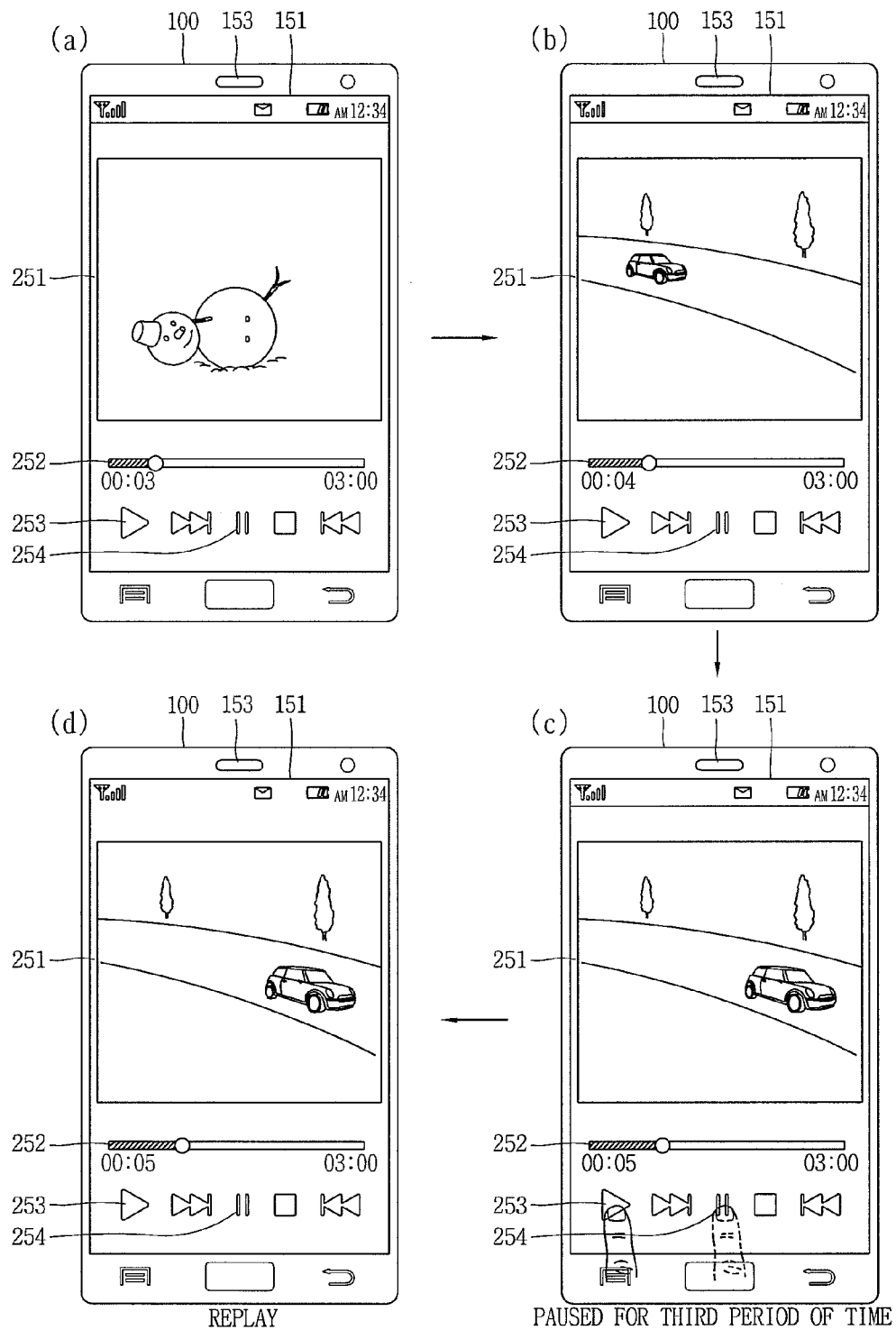

FIGS. 12 through 14 are conceptual views illustrating a user interface according to time information for which the reproduction of the content has been paused. The mobile terminal 100 may include an output unit 150 (refer to FIG. 1), an analysis unit 182 (refer to FIG. 1), and a controller 180 (refer to FIG. 1). The output unit 150 may include at least one of the display unit 151 and the audio output unit 153.

Referring to FIGS. 12A through 12C, 13A through 13C and 14A through 14C, the display unit 151 may output the content 251 being reproduced.

When the pause button 254 is touched while reproducing the content 251, the controller 180 may pause the reproduction of the content 251. Then, when the play button 253 is touched, the controller 180 may determine a time point where the reproduction of the content 251 is started based on time information for which the reproduction of the content 251 has been paused.

Specifically, referring to FIG. 12D, when time information for which the reproduction of the content 251 has been paused is a preset period of time (for example, first period of time), the controller 180 may determine a start time point of the content 251 as a time point where the reproduction of the content 251 is started. Accordingly, when the reproduction of the content 251 has been paused for a long period of time, the controller 180 may reproduce the content 251 again from the beginning.

On the other hand, referring to FIG. 13D, when time information for which the reproduction of the content 251 has been paused is a preset period of time (for example, second period of time), the controller 180 may determine a time point where the reproduction of the content 251 is started based on the analysis result as illustrated in FIGS. 5 through 9.

On the contrary, referring to FIG. 14D, when time information for which the reproduction of the content 251 has been paused is a preset period of time (for example, third period of time), the controller 180 may determine a time point where the content 251 is paused as a time point where the reproduction of the content 251 is started. Accordingly, when the reproduction of the content 251 has been paused for a very short period of time, the controller 180 may reproduce the content 251 again from the time point where the reproduction of the content is paused.

Figure 15:
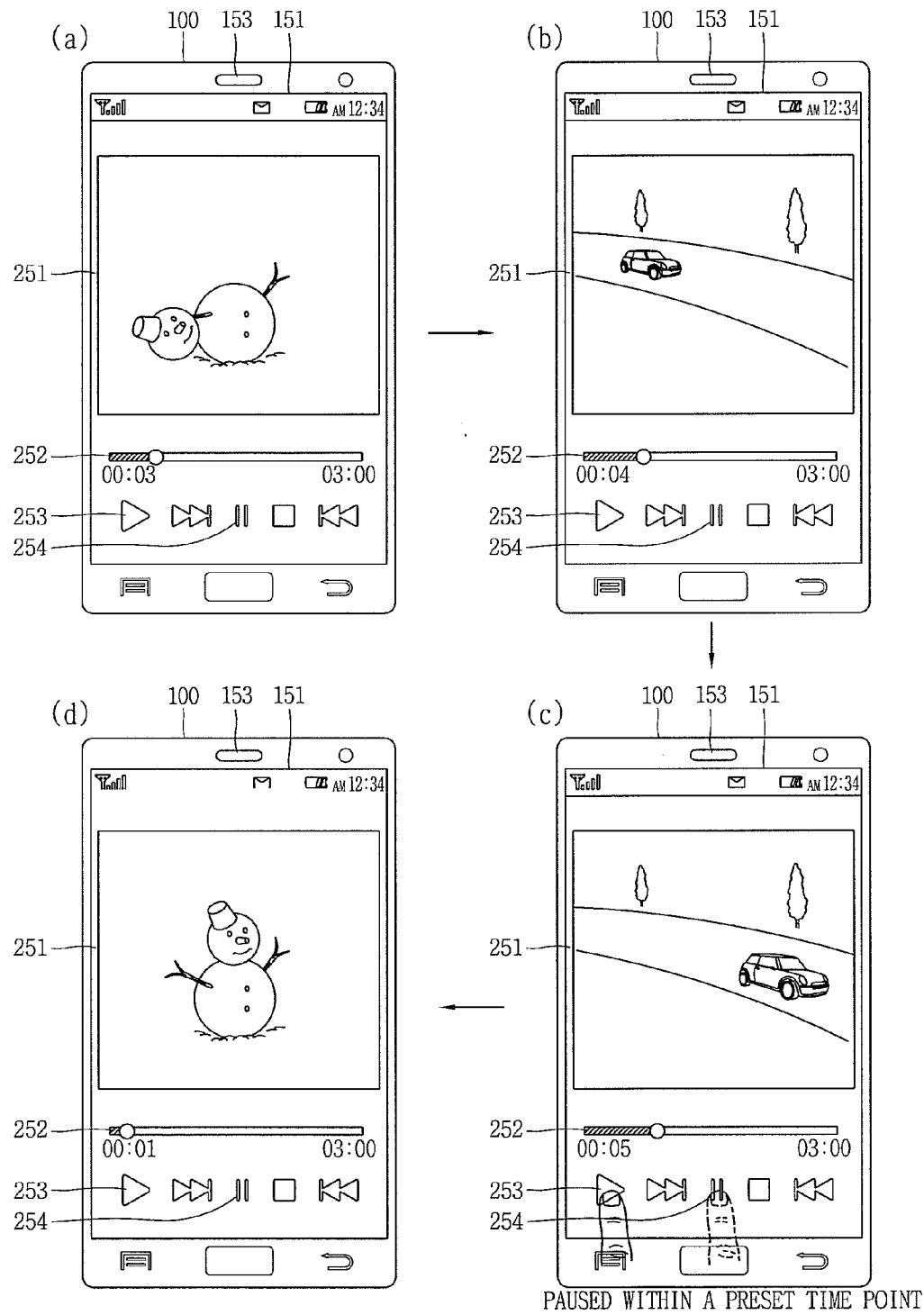
FIG. 15 is a conceptual view illustrating a user interface according to time point information at which the reproduction of the content is paused.

FIG. 15 is a conceptual view illustrating a user interface according to time point information at which the reproduction of the content is paused. The mobile terminal 100 may include an output unit 150 (refer to FIG. 1), an analysis unit 182 (refer to FIG. 1), and a controller 180 (refer to FIG. 1). The output unit 150 may include at least one of the display unit 151 and the audio output unit 153.

Referring to FIGS. 15A through 15C, the display unit 151 may output the content 251 being reproduced.

When the pause button 254 is touched while reproducing the content 251, the controller 180 may pause the reproduction of the content 251. Then, when the play button 253 is touched, the controller 180 may determine a time point where the reproduction of the content 251 is started based on time point information at which the reproduction of the content 251 is paused.

Specifically, when a control command for reproducing the content 251 again is sensed in case that the time point where the reproduction of the content 251 is paused corresponds to a position located within a preset time point on the basis of the start time point of the content 251, the controller 180 determines the start time point of the content 251 as a time point where the reproduction of the content 251 is started.

Accordingly, referring to FIG. 15D, when the reproduction of the content 251 is paused within a preset time point (for example, 5 seconds), the controller 180 may reproduce the content 251 again from the beginning.

According to an embodiment of present disclosure, the foregoing method may be implemented as codes readable by a processor on a medium written by a program. Examples of the processor-readable media may include ROM, RAM, CD-ROM, magnetic tape, floppy disk, and optical data storage device, and the like, and also include a device implemented in the form of a carrier wave (for example, transmission via the Internet).

The configurations and methods according to the above-described embodiments will not be applicable in a limited way to the foregoing mobile terminal, and all or part of each embodiment may be selectively combined and configured to make various modifications thereto.

What is claimed is:

1. A mobile terminal, comprising:
   an output unit configured to output a content; and
   a controller configured to
   reproduce the content contains at least one of video data and audio data;
   pause the reproduction of the content;
   extract a pause time point where the reproduction of the content is paused, when the reproduction of the content is paused;
   analyze an attribute of content corresponding to a period from the pause time point to a preset time point among the content, wherein the attribute of content includes objects contained in video data of content, an oscillation frequency of audio data of content, a wave shape of audio data of content and an amplitude of audio data of content;
   extract at least one time point where the attribute of content is changed based on the analysis of the attribute of content, wherein the at least one time point differs from the pause time point;
   determine a time point which is the closest to the pause time point among the extracted at least one time point; and
   start playback of the content from the determined time point in response to a control command for reproducing the content again.

2. The mobile terminal of claim 1, wherein the content comprises at least one of video data and audio data, and
   the output unit comprises:
   a display unit configured to output the video data; and
   an audio output unit configured to output the audio data.

3. The mobile terminal of claim 2, wherein the controller analyzes objects contained in the video data corresponding to the period up to the preset time point, and
   extracts at least one time point where scene is changed based on the analysis of objects contained in the video data.

4. The mobile terminal of claim 3, wherein the controller determines a time point the closest to the pause time point among the at least one time point where the scene is changed as the reproduction time point.

5. The mobile terminal of claim 2, wherein the controller analyzes a change of at least one of an oscillation frequency, a wave shape and an amplitude of the audio data corresponding to the period up to the preset time point, and extracts at least one time point based on the analysis of the change of the at least one of an oscillation frequency, a wave shape and an amplitude of the audio data.

6. The mobile terminal of claim 5, wherein the controller determines a time point the closest to the pause time point as the reproduction time point among the at least one time point where the at least one of an oscillation frequency, a wave shape and an amplitude of the audio data is changed.

7. The mobile terminal of claim 5, wherein when reproduction of the content is paused while outputting a word through the audio output unit, the controller determines a start time point of the word as the reproduction time point.

8. The mobile terminal of claim 1, wherein the controller determines the reproduction time point based on number-of-times information in which the reproduction of the content is paused.

9. The mobile terminal of claim 8, wherein when the number-of-times information in which the reproduction of the content is paused corresponds to preset number-of-times information, the controller determines the pause time point as the reproduction time point.

10. The mobile terminal of claim 1, wherein the controller determines the reproduction time point based on time elapsed for which the reproduction of the content has been paused.

11. The mobile terminal of claim 10, wherein when the time elapsed for which the reproduction of the content has been paused corresponds to preset time elapsed, the controller determines the pause time point as the reproduction time point.

12. The mobile terminal of claim 1, wherein when the control command for reproducing the content is sensed in case that the paused time point corresponds to a position located within a preset time point on the basis of a start time point of the content, the controller determines the start time point of the content as the reproduction time point.

13. A control method of a mobile terminal, the method comprising:
   outputting a content being reproduced;
   pausing the reproduction of the content;
   extracting a pause time point where the reproduction of the content is paused, when the reproduction of the content is paused;
   analyzing an attribute of content corresponding to a period from the pause time point to a preset time point among the content, wherein the attribute of content includes objects contained in video data of content, an oscillation frequency of audio data of content, a wave shape of audio data of content and an amplitude of audio data of content;
   extracting at least one time point where the attribute of content is changed based on the analysis of the attribute of content
   determining a time point which is closest to the pause time point among the extracted at least one time point; and
   starting playback of the content from the determined time point in response to a control command for reproducing the content again.

* * * * *